United States Patent
Park et al.

(10) Patent No.: US 11,329,272 B2
(45) Date of Patent: May 10, 2022

(54) METHOD OF MANUFACTURING ELECTRODE FOR SECONDARY BATTERY COMPRISING PRE-SLITTING PROCESS

(71) Applicant: LG CHEM, LTD., Seoul (KR)

(72) Inventors: Sang Youn Park, Seoul (KR); Kyu Hyun Choi, Yongin-si (KR); Jin Hak Kong, Seoul (KR)

(73) Assignee: LG Energy Solution, Ltd.

(*) Notice: Subject to any disclaimer, the term of this patent is extended or adjusted under 35 U.S.C. 154(b) by 246 days.

(21) Appl. No.: 16/071,379

(22) PCT Filed: Aug. 11, 2017

(86) PCT No.: PCT/KR2017/008719
§ 371 (c)(1),
(2) Date: Jul. 19, 2018

(87) PCT Pub. No.: WO2018/066806
PCT Pub. Date: Apr. 12, 2018

(65) Prior Publication Data
US 2020/0203712 A1   Jun. 25, 2020

(30) Foreign Application Priority Data
Oct. 7, 2016 (KR) .................. 10-2016-0130087

(51) Int. Cl.
*H01M 4/04* (2006.01)
*H01M 4/139* (2010.01)
(Continued)

(52) U.S. Cl.
CPC ............. *H01M 4/139* (2013.01); *H01M 4/04* (2013.01); *H01M 4/0404* (2013.01);
(Continued)

(58) Field of Classification Search
USPC .......................................... 427/58, 98.4, 115
See application file for complete search history.

(56) References Cited

U.S. PATENT DOCUMENTS

| | | | | |
|---|---|---|---|---|
| 5,411,592 | A | * | 5/1995 | Ovshinsky ............ C23C 16/545 118/718 |
| 8,790,418 | B2 | | 7/2014 | Kim et al. |

(Continued)

FOREIGN PATENT DOCUMENTS

| JP | 2000-208129 A | 7/2000 |
|---|---|---|
| JP | 2002-237292 A | 8/2002 |

(Continued)

OTHER PUBLICATIONS

International Search Report for PCT/KR2017/008719(PCT/ISA/210) dated Dec. 11, 2017.

*Primary Examiner* — Brian K Talbot
(74) *Attorney, Agent, or Firm* — Lerner, David, Littenberg, Krumholz & Mentlik, LLP

(57) ABSTRACT

Disclosed herein is a method of manufacturing an electrode for a secondary battery, including: a process of continuously forming two or more slurry coated parts on one surface or both surfaces of metal foil in a second direction which is a longitudinal direction of the metal foil so that a non-coated part which an electrode slurry is not coated is positioned between the slurry coated parts coated with the electrode slurry including an electrode active material in a first direction which is a transverse direction of the metal foil; a process of forming mixture coated parts by drying the slurry coated parts and rolling by a roller; and a process of forming electrode strips by slitting the non-coated part in the second direction, wherein before continuously forming the slurry coated parts, while continuously forming the slurry coated parts, or between continuously forming the slurry coated parts and forming the mixture coated parts, the method (Continued)

US 11,329,272 B2
Page 2 further includes a process of forming non-continuous linear slits in the non-coated part of the metal foil in the second direction.

11 Claims, 11 Drawing Sheets

(51) Int. Cl.
  *H01M 4/66* (2006.01)
  *H01M 4/13* (2010.01)
  *H01M 4/26* (2006.01)
(52) U.S. Cl.
  CPC ....... *H01M 4/0435* (2013.01); *H01M 4/0471* (2013.01); *H01M 4/13* (2013.01); *H01M 4/661* (2013.01); *H01M 4/26* (2013.01)

(56) References Cited

U.S. PATENT DOCUMENTS

| 8,828,102 B2* | 9/2014 | Ito ..................... H01M 10/0431 29/623.1 |
|---|---|---|
| 2011/0104539 A1* | 5/2011 | Oh ........................... H01M 2/22 429/94 |
| 2012/0058387 A1* | 3/2012 | Ahn ..................... H01M 2/0275 429/163 |
| 2013/0230641 A1 | 9/2013 | Suzuki |
| 2014/0227583 A1* | 8/2014 | Do ................... H01M 10/0585 429/162 |
| 2019/0237746 A1* | 8/2019 | Sato .................. H01M 10/0585 |
| 2019/0355962 A1* | 11/2019 | Tahara ..................... B05C 9/06 |

FOREIGN PATENT DOCUMENTS

| JP | 2008-066050 | * | 3/2008 |
|---|---|---|---|
| JP | 2008-066050 A | | 3/2008 |
| JP | 2010-244748 A | | 10/2010 |
| JP | 2014-072114 A | | 4/2014 |
| JP | 2014-179217 A | | 9/2014 |
| JP | 5609839 B2 | | 10/2014 |
| JP | 2016-001575 | * | 1/2016 |
| JP | 2016-001575 A | | 1/2016 |
| KR | 10-1999-0015401 A | | 3/1999 |
| KR | 10-2017-0009468 A | | 1/2017 |

* cited by examiner

METHOD OF MANUFACTURING ELECTRODE FOR SECONDARY BATTERY COMPRISING PRE-SLITTING PROCESS

TECHNICAL FIELD

The present disclosure relates to a method of manufacturing an electrode for a secondary battery including a pre-slitting process.

BACKGROUND ART

Recent trends in the development of the electronic industry can be summarized as wireless functions of a device, a mobile trend, and a transition from analog to digital. The rapid dissemination of wireless phones (so-called mobile phones) and notebook computers, and the transition from analog cameras to digital cameras may be referred to as representative examples of such trends.

Along with this tendency, research and development on secondary batteries as an operating power source of a device have been actively proceeding. Among such secondary batteries, a lithium secondary battery having a great output and capacity in comparison to its weight and using a lithium transition metal oxide, a lithium composite oxide, and the like as a positive electrode active material has received particular attention. The lithium secondary battery has a structure in which an electrode assembly of a positive electrode/a separator/a negative electrode is embedded in a sealed container together with an electrolyte.

Meanwhile, an electrode generate current via the exchanges of ions, and a positive electrode and a negative electrode constituting the electrode have a structure in which an electrode active material is applied to an electrode current collector made of metal.

Generally, the negative electrode has a structure in which a carbon-based active material is applied to an electrode plate made of copper, aluminum, and the like, and the positive electrode has a structure in which an active material made of $LiCoO_2$, $LiMnO_2$, $LiNiO_2$ and the like is coated on an electrode plate made of aluminum and the like.

In order to manufacture the positive electrode or the negative electrode, an electrode mixture including an electrode active material is applied to an electrode current collector made of a metal sheet which is elongated in one direction.

FIG. 1 is a schematic plan view in which a roll press process is performed on an electrode-processed body to which an electrode mixture of the related art is applied.

Referring to FIG. 1, through the roll press process, heated rollers 30 and 31 are placed on upper and lower surfaces of an electrode-processed body 10 on which an electrode slurry 14 including an electrode active material is applied, and the heated rollers 30 and 31 press the electrode slurry 14 in a direction of the electrode-processed body 10. In the roll press process, a solvent remaining in the electrode slurry is evaporated, and the electrode slurry is compressed and cured on the electrode to form an electrode mixture layer having improved energy density. Thereafter, a process for processing an outer shape of a set electrode is performed.

FIG. 2 is a schematic plan view illustrating a process of slitting an electrode-processed body of the related art.

Referring to FIG. 2, an electrode current collector coated with the electrode mixture 14, made of a metal sheet which is elongated in one direction $D_2$ is slit using a cutter 20, and the electrode current collector is divided into electrode strips.

In particular, a first direction $D_1$ is a transverse direction of a metal foil, and the second direction $D_2$ is a longitudinal direction of the metal foil.

FIG. 3 is a schematic perspective view illustrating a process of forming an electrode tab in an electrode-processed body of the related art.

Referring to FIG. 3, electrode-processed bodies 10 and 11 manufactured through a slitting process are subjected to a notching process for processing shapes of electrode tabs 18 and 19 using a metal mold or a laser. In particular, the electrode-processed body 10 is cut by metal molds 20, 21, 22, and 23 to process the shapes of the electrode tab 18 and a coated part 17 coated with an electrode mixture.

Thereafter, an electrode having the shape of the electrode tab is subjected to a process of laminating a separator and a negative electrode and/or a positive electrode, and then laminating the result thereof to manufacture a unit cell. Then, unit cells thus manufactured are placed on, for example, a long separation film, and a folding process is performed to manufacture an electrode assembly.

Most of the roll press process, the slitting process, the notching process, the lamination process, and the folding process described above use a roll-to-roll process, and the roll-to-roll process refers to a process capable of performing processes such as coating and printing while moving a plurality of bendable metal foils and the like between rollers. For example, there is a method in which a roll on which a thin flexible sheet-like material is wound is unwound to supply the material, coating or printing is performed on the supplied material, and the processed material is rewound on another roll.

FIG. 4 is a schematic plan view of an electrode-processed body having an electrode tab formed by a notching process.

Referring to FIGS. 1, 2, and 3 together, in the electrode manufacturing method of the related art, when the roll press process of the electrode-processed body 10 coated with the electrode mixture is performed, a difference in elongation between the coated part 17 coated with the electrode mixture and the non-coated part 18 only with a metal foil and not being coated with the electrode mixture occurs so that, in the non-coated part, a wave pattern 15 is generated near a boundary with the coated part. Further, after the roll press process, when a shear force is applied to the non-coated part by a cutter during the slitting process, the previously generated wrinkles or wave pattern becomes longer and deeper.

Because of this, in the process of manufacturing the electrode, the non-coated part is folded by a wrinkle or wave pattern formed during the roll-to-roll process, or the wave pattern 15 is formed in some parts of the electrode tab 18 formed on the non-coated part 15 after the notching process of the electrode. As a result, when external interference occurs at the electrode tab, there is a problem in that the electrode tab is easily folded due to wrinkles formed on the electrode tab, resulting failure.

Therefore, development of technology capable of reducing defects caused by folding of a non-coated part or an electrode tab due to wrinkles or patterns generated during the process of manufacturing an electrode of a secondary battery is in demand.

DISCLOSURE

Technical Problem

The present disclosure is provided to solve the above technical problems of the related art.

The inventors of the present disclosure have conducted intensive researches and various experiments and have found that, as will be described later, in a method of manufacturing an electrode for a secondary battery, before a process of forming electrode strips by slitting a non-coated part in a second direction, when a process of forming non-continuous linear slits in the non-coated part of a metal foil in the second direction is further included, it is possible to prevent wrinkles or wave patterns from being generated and intensified, and also possible to reduce defects due to the folding of the non-coated part or an electrode tab, thereby completing the present disclosure.

Technical Solution

The present disclosure provides a method of manufacturing an electrode for a secondary battery including:

a process of continuously forming two or more slurry coated parts on one surface or both surfaces of a metal foil in a second direction which is a longitudinal direction of the metal foil so that a non-coated part which an electrode slurry is not coated is positioned between the slurry coated parts coated with the electrode slurry including an electrode active material in a first direction which is a transverse direction of the metal foil; a process of forming mixture coated parts by drying the slurry coated parts and rolling by a roller; and a process of forming electrode strips by slitting the non-coated part in the second direction.

The method may further include, before continuously forming the slurry coated parts, while continuously forming the slurry coated parts, or between continuously forming the slurry coated parts and forming the mixture coated parts, a process of forming non-continuous linear slits in the non-coated part of the metal foil in the second direction.

Therefore, the method of manufacturing an electrode for a secondary battery can prevent wrinkles or wave patterns generated when a shear force is applied to the non-coated part by a cutter during the slitting process from being further lengthened and intensified by previously performing the process of forming the non-continuous linear slits in the non-coated part of the metal foil in the second direction before continuously forming the slurry coated parts, while continuously forming the slurry coated parts, or between continuously forming the slurry coated parts and forming the mixture coated parts, thereby reducing the folding of the non-coated part or the electrode tab due to the wrinkles or wave patterns.

In an exemplary embodiment, the metal foil may be made of one or more selected from the group consisting of stainless steel, aluminum, copper, nickel, titanium, and aluminum alloy.

In an exemplary embodiment, the process of forming the non-continuous linear slits may be performed before continuously forming the slurry coated parts. That is, before the electrode slurry including the electrode active material is coated on the metal foil, the non-continuous linear slits may be formed on the non-coated part of the metal foil in the second direction.

In another exemplary embodiment, the process of forming the non-continuous linear slits may be performed while continuously forming the slurry coated parts. That is, while the electrode slurry including the electrode active material is being coated on the metal foil, the non-continuous linear slits may be formed on the non-coated part of the metal foil in the second direction.

In another exemplary embodiment, the process of forming the non-continuous linear slits may be performed between continuously forming the slurry coated parts and forming the mixture coated parts. That is, after coating the metal foil with the electrode slurry including the electrode active material and before performing the roll press process of drying the slurry coated parts and rolling by a roller, the non-continuous linear slits may be formed on the non-coated part of the metal foil in the second direction.

In an exemplary embodiment, the non-continuous linear slits may be formed perpendicular to the first direction, in particular, the non-continuous linear slits may be formed in a direction coinciding with a direction of slitting in the process of forming the electrode strips.

In addition, a length of each of the non-continuous linear slits may be in a range of about 1 to 200 mm, in particular, when the length is less than 1 mm, it may be difficult to exhibit an effect required by the present disclosure, when the length is more than 200 mm, the non-coated part of the metal foil may be separated during transportation, which may make handling difficult.

Further, an interval between the non-continuous linear slits may be in a range of about 1 to 1000 mm. When the interval is less than 1 mm, the interval between the linear slits may be so small that the non-coated part of the metal foil may be separated during transportation, which may make handling difficult, and when the interval is more than 1000 mm, it may be difficult to exhibit an effect required by the present disclosure.

In an exemplary embodiment, in the process of forming the electrode strips, the slitting of the non-coated part may be performed by cutting between the non-continuous linear slits, and more specifically, a cutter for slitting may move in the second direction which is the longitudinal direction of the metal foil, thereby cutting between the linear slits.

In an exemplary embodiment, after the process of forming the electrode strips, a notching process of forming the electrode tab by partially cutting the slit non-coated part of the electrode strip may be further included.

In addition, after the notching process, a cutting process of forming a unit electrode by cutting the electrode strip uniformly in the first direction may be further included.

Since devices used to manufacture the electrode for a secondary battery are well known in the art, detailed description thereof will be omitted herein.

The present disclosure also provides an electrode for a secondary battery manufactured according to the method of manufacturing the electrode for a secondary battery.

The present disclosure also provides a lithium secondary battery including the electrode for a secondary battery.

In particular, the lithium secondary battery may have a structure in which an electrode assembly including a negative electrode, a positive electrode and a separator interposed between the negative electrode and the positive electrode are embedded together with a non-aqueous electrolyte solution in a pouch-shaped battery case.

Also, the pouch-shaped battery case may be made of a laminated sheet including an outer resin layer made of a polymer resin having weather resistance, a metal layer having gas and liquid barrier properties, and an inner resin layer made of a polymer resin having thermal fusion properties, and the battery cell may be plate-shaped with a rectangular parallelepiped structure of a small thickness with respect to the width.

The positive electrode may be manufactured, for example, by coating a mixture of a positive electrode active material, a conductive material and a binder on a positive electrode current collector and drying. If necessary, a filler may be further added to the mixture.

The positive electrode active material may be a material capable of causing an electrochemical reaction, and may be a lithium transition metal oxide and may include two or more transition metals. Examples of the positive electrode active material may include layered compounds such as lithium cobalt oxide ($LiCoO_2$) substituted with one or more transition metals, lithium nickel oxide ($LiNiO_2$); lithium manganese oxides substituted with one or more transition metals; lithium nickel-based oxides having formula $LiNi_{1-y}M_yO_2$ (wherein, M includes one or more elements selected from the group consisting of Co, Mn, Al, Cu, Fe, Mg, B, Cr, Zn or Ga, and $0.01 \leq x \leq 0.7$); lithium nickel cobalt manganese composite oxides having formula $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$ and $Li_{1+z}Ni_{0.4}Mn_{0.4}Co_{0.2}O_2$ (wherein, $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si or Y and A=F, P or Cl); Olivine-based lithium metal phosphates having formula $Li_{1+x}M_{1-y}M'_yPO_{4-z}X_z$ (wherein, M is a transition metal, preferably M=Fe, Mn, Co or Ni, M'=Al, Mg or Ti, X=F, S or N, $-0.5 \leq x \leq +0.5$, $0 \leq y \leq 0.5$ and $0 \leq z \leq 0.1$); and the like, but embodiments of the present disclosure are not limited thereto.

The conductive material may be generally added in an amount of 1 to 20 wt % based on the total weight of a mixture including a positive electrode active material. There is no particular limit as to the conductive material, so long as it does not cause chemical changes in the fabricated battery and has conductivity. For example, graphite such as natural or artificial graphite; carbon black such as carbon black, acetylene black, ketjen black, channel black, furnace black, lamp black, and thermal black; conductive fibers such as carbon fiber and metallic fiber; metallic powders such as carbon fluoride powder, aluminum powder, and nickel powder; conductive whiskers such as zinc oxide whiskers and potassium titanate whiskers; conductive metal oxides such as titanium oxide; conductive materials such as polyphenylene derivatives; and etc. may be used.

The filler may be optionally used as a component to inhibit positive electrode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

In addition, the negative electrode may be manufactured by coating and drying a mixture of a negative electrode active material, a conductive material a binder on a negative electrode current collector. As desired, a filler may be further added to the mixture. Also, the negative electrode active material may be one or more selected from the group consisting of graphite carbon, coke-based carbon and hard carbon.

The present disclosure also provides a battery pack including the lithium secondary battery as a unit cell.

The present disclosure also provides a device including the battery pack. Examples of the device include mobile phones, portable computers, wearable electronic devices, tablet PCs, smart pads, netbooks, LEV (Light Electronic Vehicle), electric vehicles, hybrid electric vehicles and power storage devices, but are not limited thereto.

Since the structure and manufacturing method of the device are well known in the art, detailed description thereof will be omitted herein.

Advantageous Effects

As described above, the method of manufacturing the electrode for a secondary battery according to the present disclosure can prevent wrinkles or wave patterns generated when a shear force is applied to the non-coated part by a cutter during the slitting process from being longer and deeper by previously performing the process of forming non-continuous linear slits in the non-coated part of the metal foil in the second direction before continuously forming the slurry coated parts, while continuously forming the slurry coated parts, or between continuously forming the slurry coated parts and forming the mixture coated parts, thereby reducing defects due to the folding of the non-coated part or the electrode tab.

DETAILED DESCRIPTION OF THE PREFERRED EMBODIMENTS

Hereinafter, embodiments of the present disclosure will be described with reference to the accompanying drawings. However, the description provided herein is for a better understanding of the present disclosure, and the scope of the present disclosure is not limited thereto.

Figure 1:
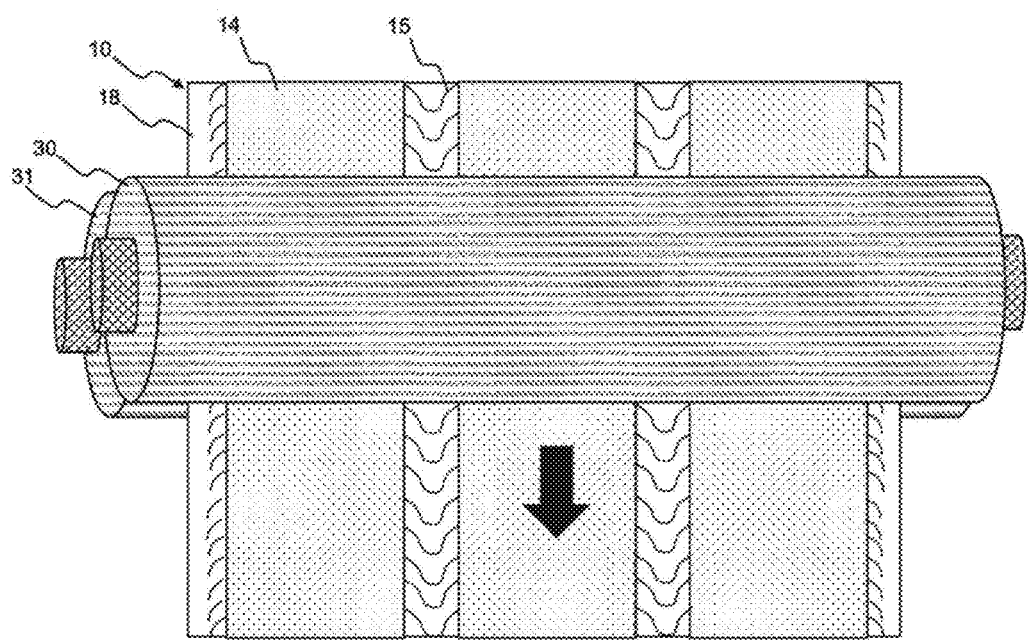
FIG. 1 is a schematic plan view in which a roll press process is performed on an electrode-processed body to which an electrode mixture of the related art is applied.
Figure 2:
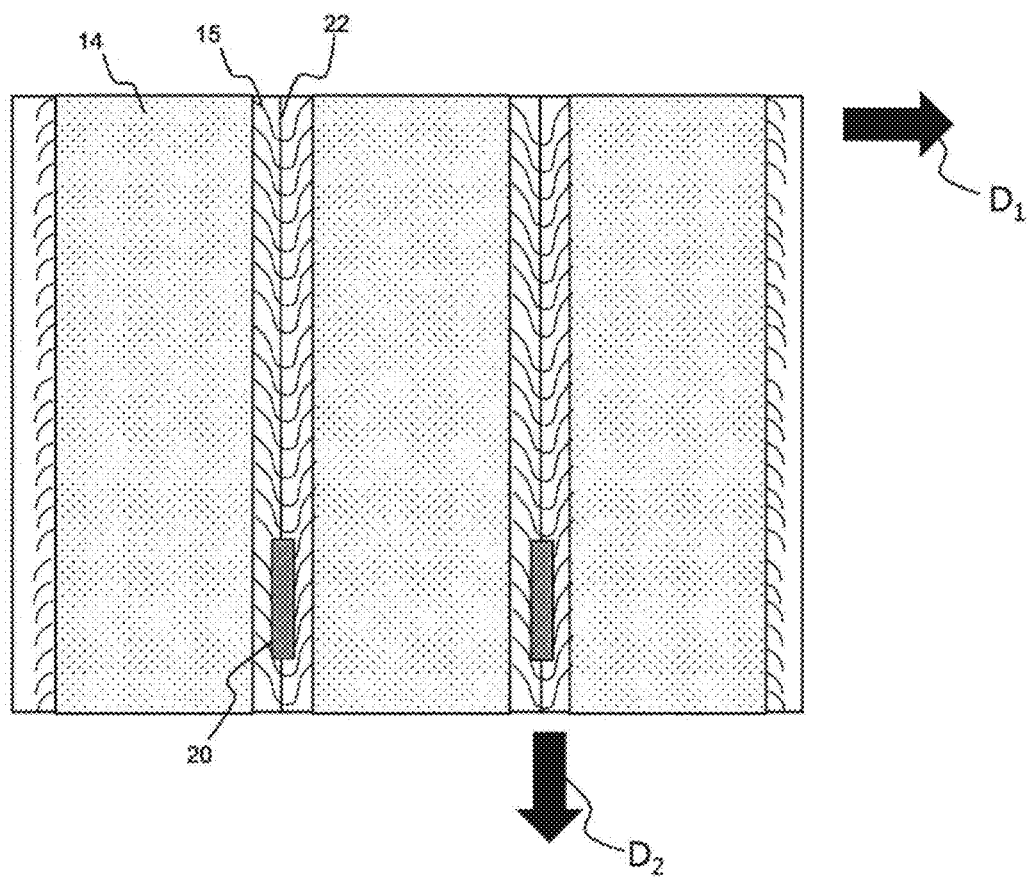
FIG. 2 is a schematic plan view illustrating a process of slitting an electrode-processed body of the related art.
Figure 3:
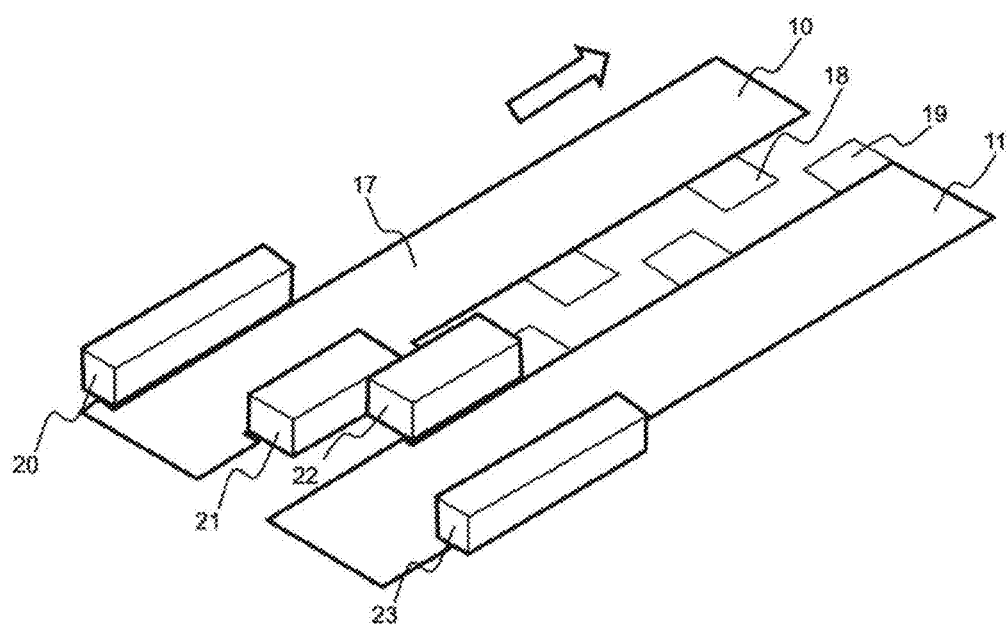
FIG. 3 is a schematic perspective view illustrating a process of forming an electrode tab in an electrode-processed body of the related art.
Figure 4:
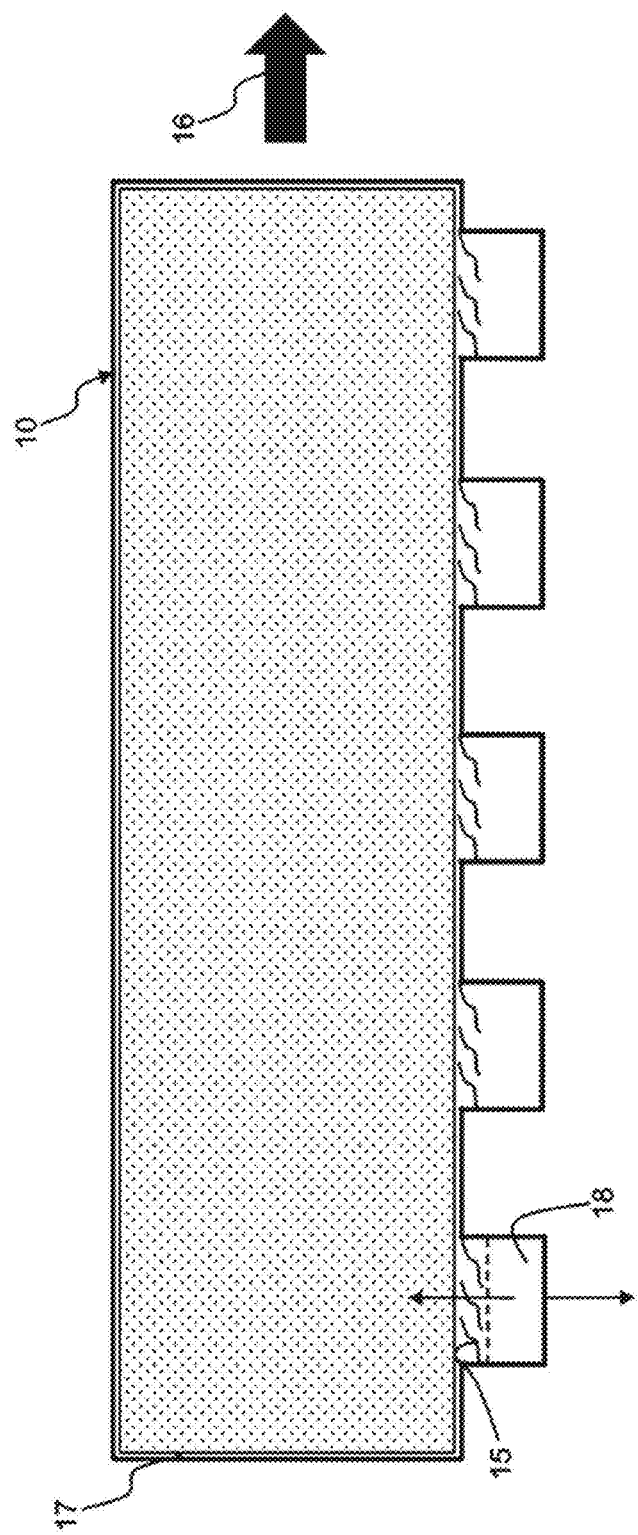
FIG. 4 is a schematic plan view of an electrode-processed body having an electrode tab formed by a notching process of the related art.
Figure 5:
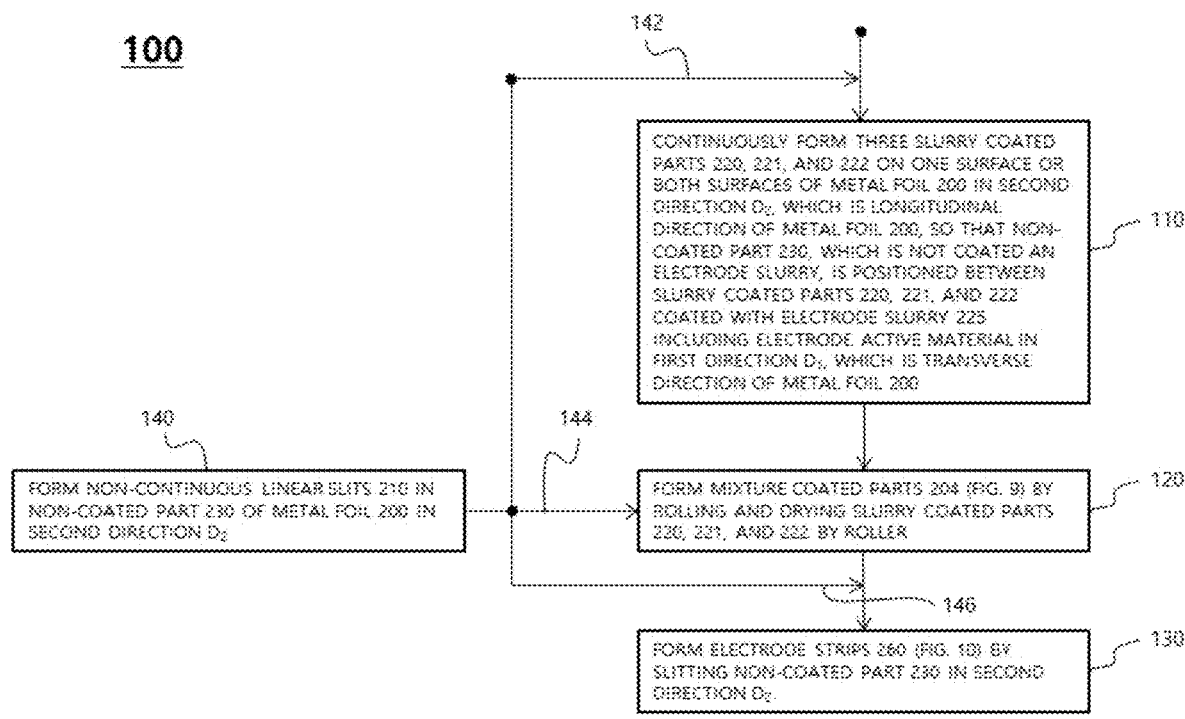
FIG. 5 is a flowchart illustrating a process of manufacturing an electrode for a secondary battery according to an exemplary embodiment of the present disclosure.
Figure 6:
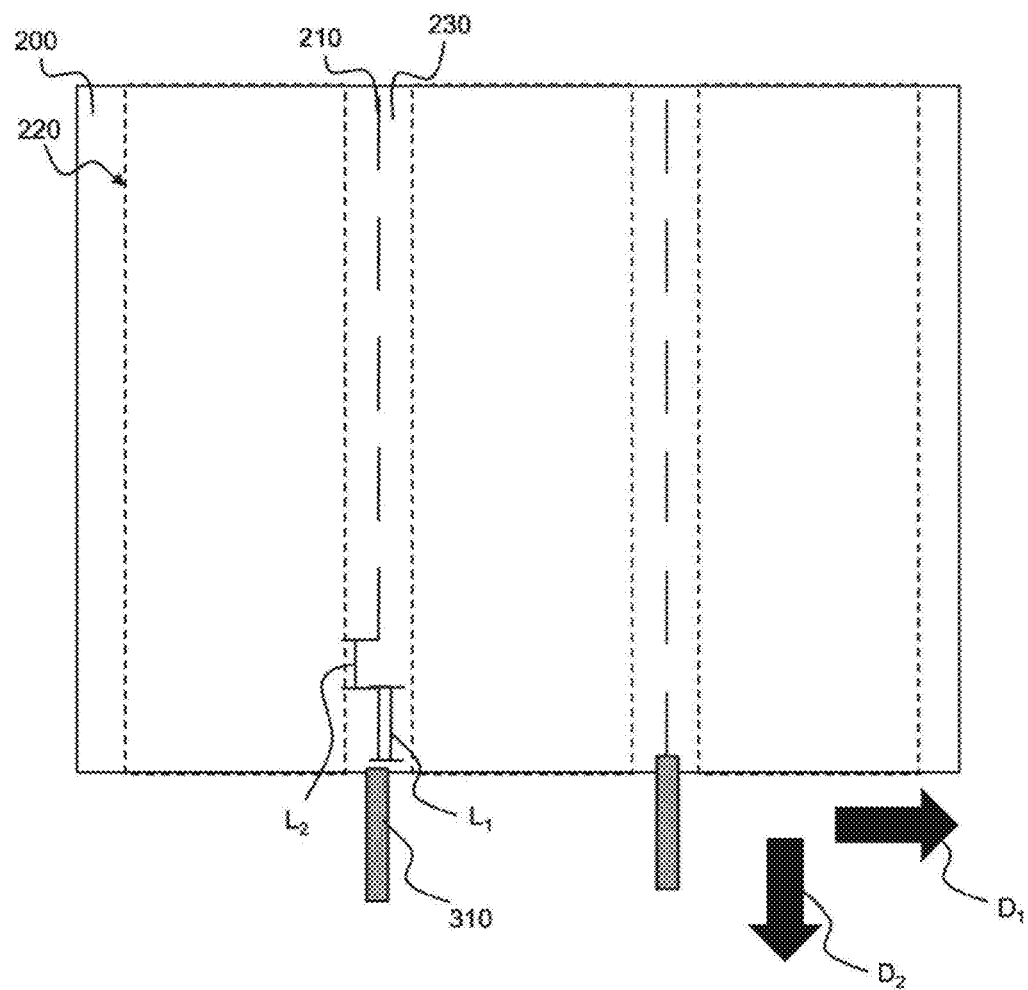
FIG. 6 is a schematic plan view of a metal foil before a process 110 is performed in a method of manufacturing an electrode for a secondary battery according to an exemplary embodiment of the present disclosure.
Figure 7:
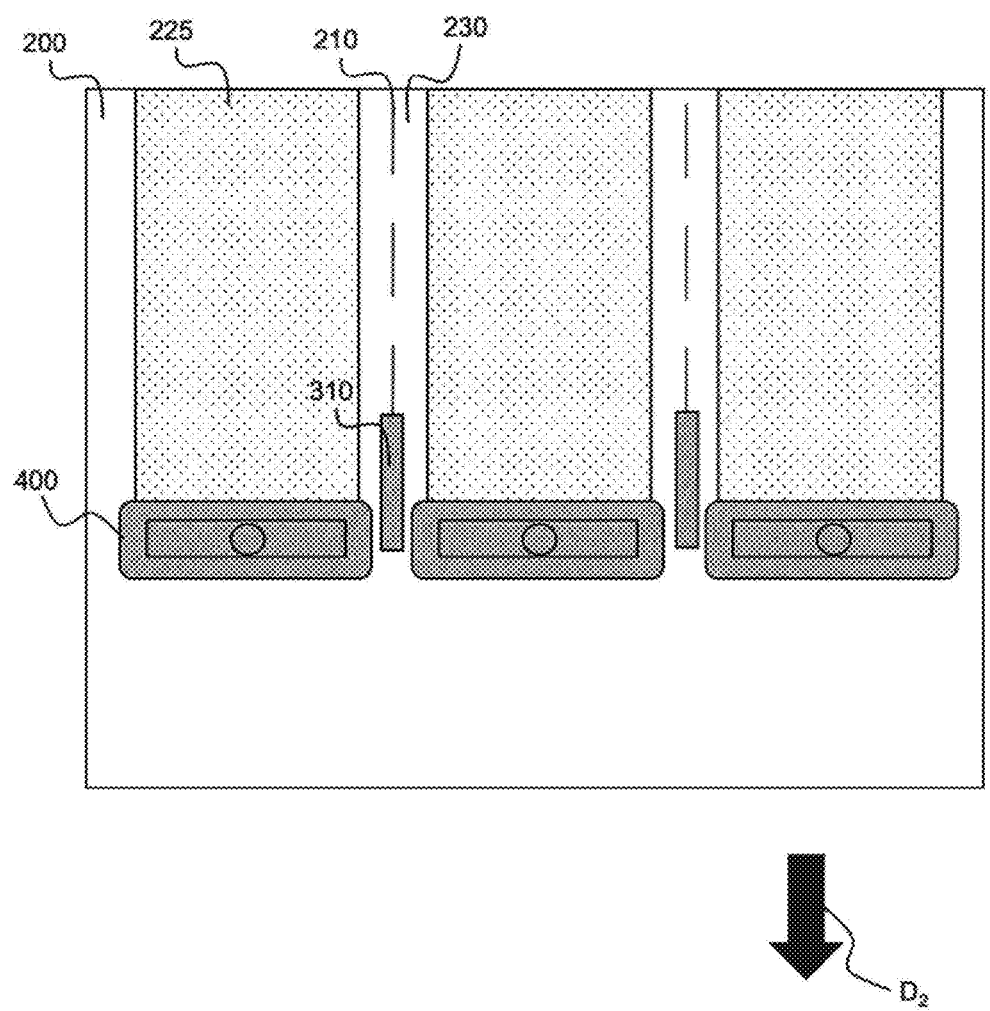
FIG. 7 is a schematic plan view of a metal foil while a process 110 is being performed in a method of manufacturing an electrode for a secondary battery according to another exemplary embodiment of the present disclosure.

FIG. 5 is a flowchart illustrating a process of manufacturing an electrode for a secondary battery according to an exemplary embodiment of the present disclosure, FIG. 6 is a schematic plan view of a metal foil before a process 110 is performed in a method of manufacturing an electrode for a secondary battery according to an exemplary embodiment of the present disclosure, and FIG. 7 is a schematic plan view of a metal foil while the process 110 is performed in a method of manufacturing an electrode for a secondary battery according to another exemplary embodiment of the present disclosure.

Referring to FIG. 5 to FIG. 7, a method 100 of manufacturing an electrode for a secondary battery according to the present disclosure may include a process 110 of continuously forming three slurry coated parts 220, 221, and 222 on one surface or both surfaces of a metal foil 200 in a second direction $D_2$, which is a longitudinal direction of the metal foil 200, so that a non-coated part 230, which is not coated with an electrode slurry, is positioned between the slurry coated parts 220, 221, and 222 coated with an electrode slurry 225 including an electrode active material in a first direction $D_1$, which is a transverse direction of the metal foil 200, a process 120 of forming mixture coated parts 204 (FIG. 9) by rolling and drying the slurry coated parts 220, 221, and 222 by a roller, and a process 130 of forming electrode strips 260 (FIG. 10) by slitting the non-coated part 230 in the second direction $D_2$.

In particular, the metal foil 200 may be made of aluminum when a positive electrode current collector is manufactured, and copper may be used as the metal foil 200 when a negative electrode current collector is manufactured.

Referring to FIG. 5 and FIG. 6, a process 140 of forming non-continuous linear slits 210 in the non-coated part 230 of the metal foil 200 in the second direction $D_2$ by a cutter member 310 may be performed before the process 110 of coating the metal foil 200 with the electrode slurry (not shown) including the electrode active material.

In addition, the non-continuous linear slits 210 may be formed perpendicular to the first direction $D_1$, and the non-continuous linear slits 210 may also be formed in a direction coinciding with the second direction $D_2$ of slitting in the process 130.

Further, a length $L_1$ of each of the non-continuous linear slits 210 may be in a range of about 1 to 200 mm, and an interval $L_2$ between the non-continuous linear slits 210 may be in a range of about 1 to 1,000 mm.

Referring to FIG. 5 and FIG. 7, in the process of forming the non-continuous linear slits 210, the process 140 of forming non-continuous linear slits 210 in the non-coated part 230 of the metal foil 200 in the second direction $D_2$ by a cutter member 310 may be performed during the process 110 of coating the metal foil 200 with the electrode slurry 225 including the electrode active material by a discharge member 400.

Figure 8:
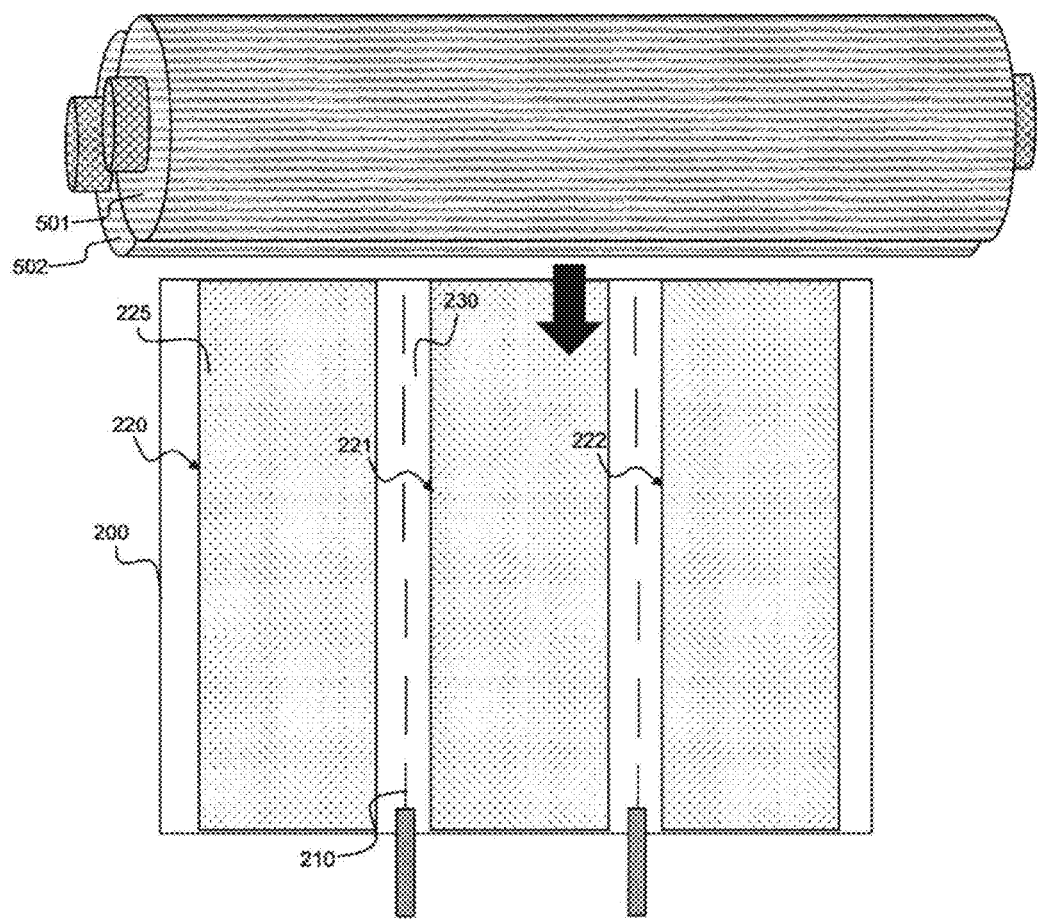
FIG. 8 is a schematic plan view of a metal foil between a process 110 and a process 120 in a method of manufacturing an electrode for a secondary battery according to still another exemplary embodiment of the present disclosure.

FIG. 8 is a schematic plan view of a metal foil between the process 110 and the process 120 in a method of manufacturing an electrode for a secondary battery according to still another exemplary embodiment of the present disclosure.

Referring to FIG. 5 and FIG. 8, the process 140 of forming the non-continuous linear slits 210 in the non-coated part 230 of the metal foil 200 in the second direction $D_2$ may be performed between the process 110 of coating the metal foil 200 with the electrode slurry 225 including the electrode active material and the process 120 of performing a roll press process of rolling and drying the slurry coated parts 220, 221 and 222 by rollers 501 and 502.

Figure 9:
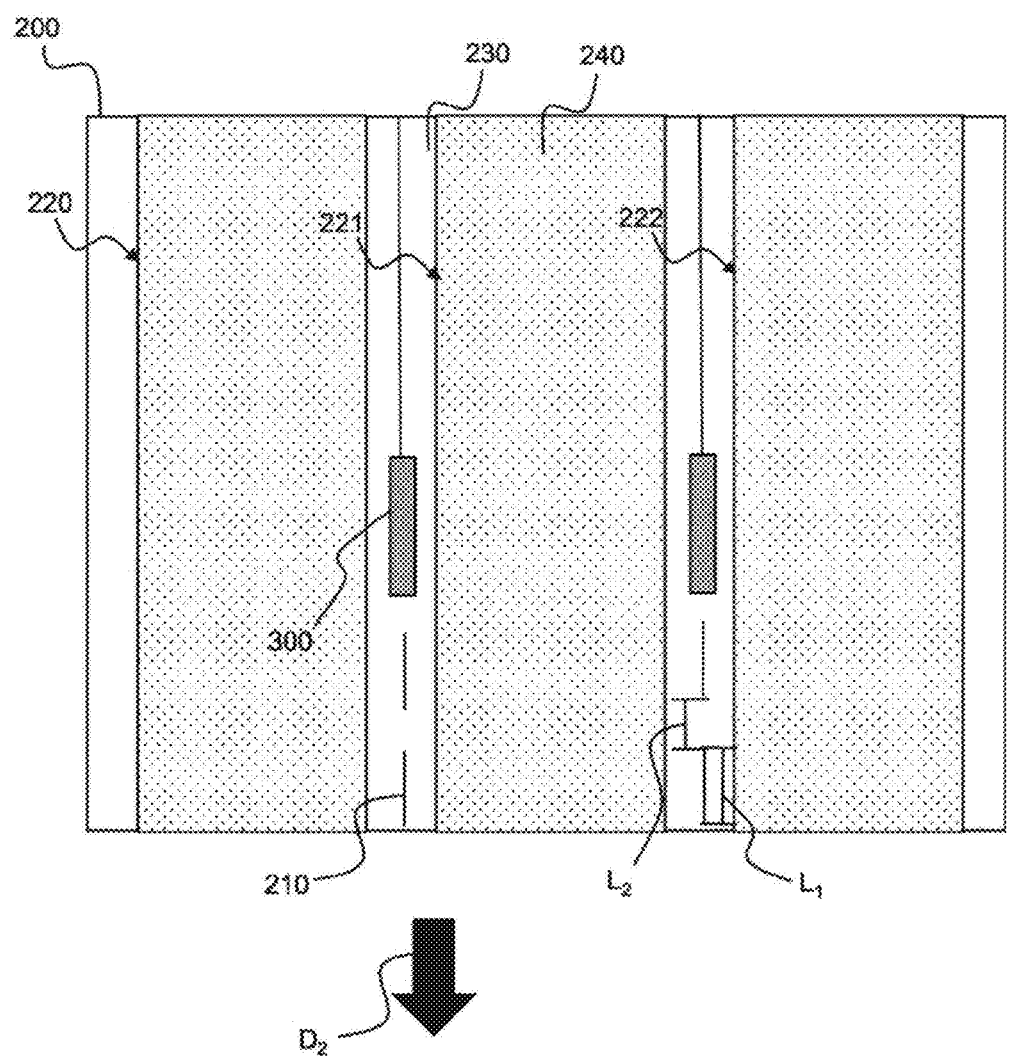
FIG. 9 is a schematic plan view illustrating a process 130 in a method of manufacturing an electrode for a secondary battery according to an exemplary embodiment of the present disclosure.

FIG. 9 is a schematic plan view illustrating the process 130 in a method of manufacturing an electrode for a secondary battery according to an exemplary embodiment of the present disclosure.

Referring to FIGS. 5 and 9, in the process 130, the slitting of the non-coated part 230 may be performed by cutting between the non-continuous linear slits 210 by a cutter 300 for slitting moving in the second direction $D_2$, which is the longitudinal direction of the metal foil 200.

Figure 10:
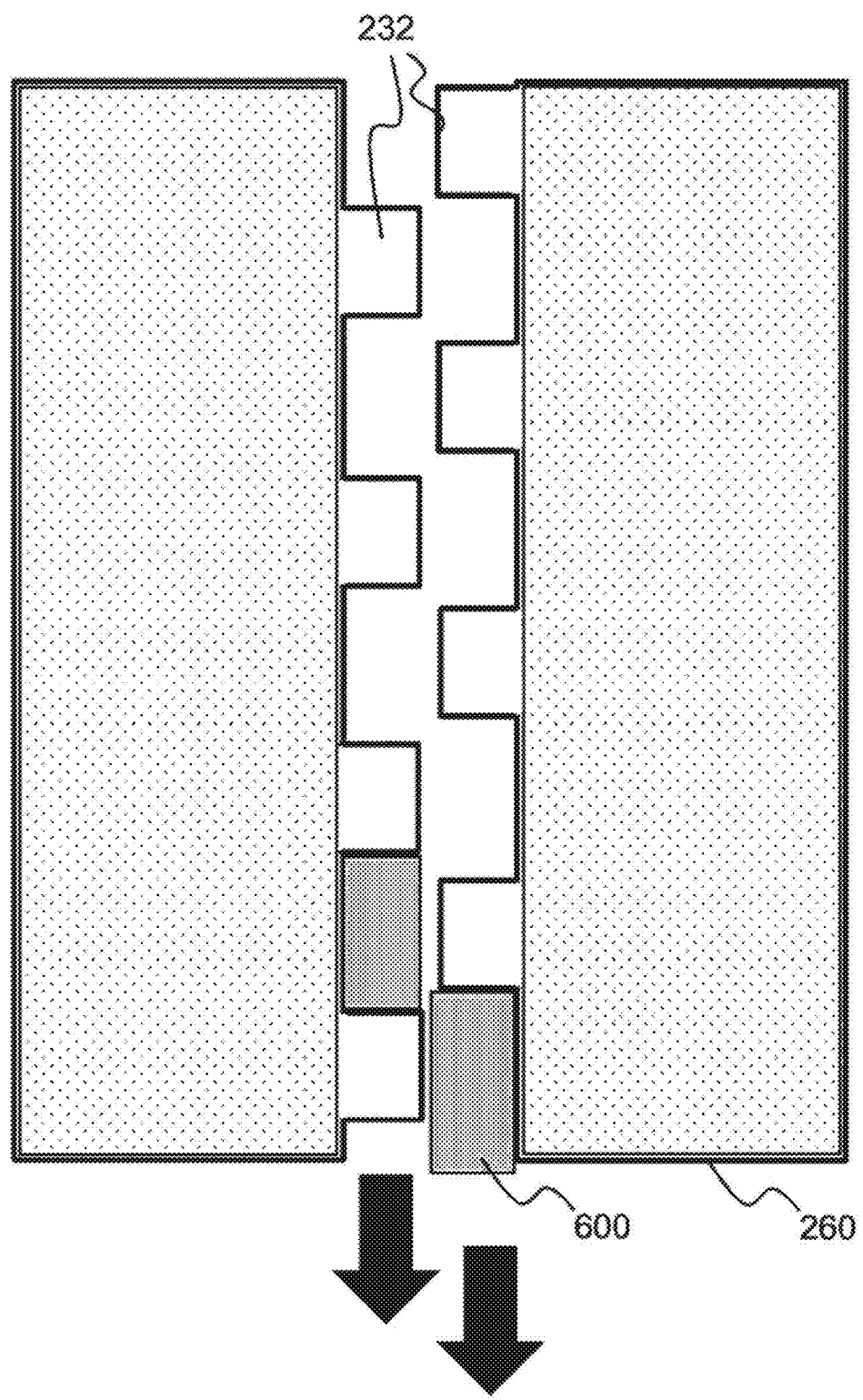
FIG. 10 is a schematic plan view illustrating a notching process of forming an electrode tab in a method of manufacturing an electrode for a secondary battery according to an exemplary embodiment of the present disclosure.

FIG. 10 is a schematic plan view illustrating a notching process of forming an electrode tab in a method of manufacturing an electrode for a secondary battery according to an exemplary embodiment of the present disclosure.

Referring to FIGS. 5, 9 and 10, in the method of manufacturing an electrode for a secondary battery according to an exemplary embodiment of the present disclosure, after the process 130, a notching process of forming electrode tabs 232 by partially cutting the slit non-coated part 230 of the electrode strip 260 using a metal mold 600 is further performed.

Figure 11:
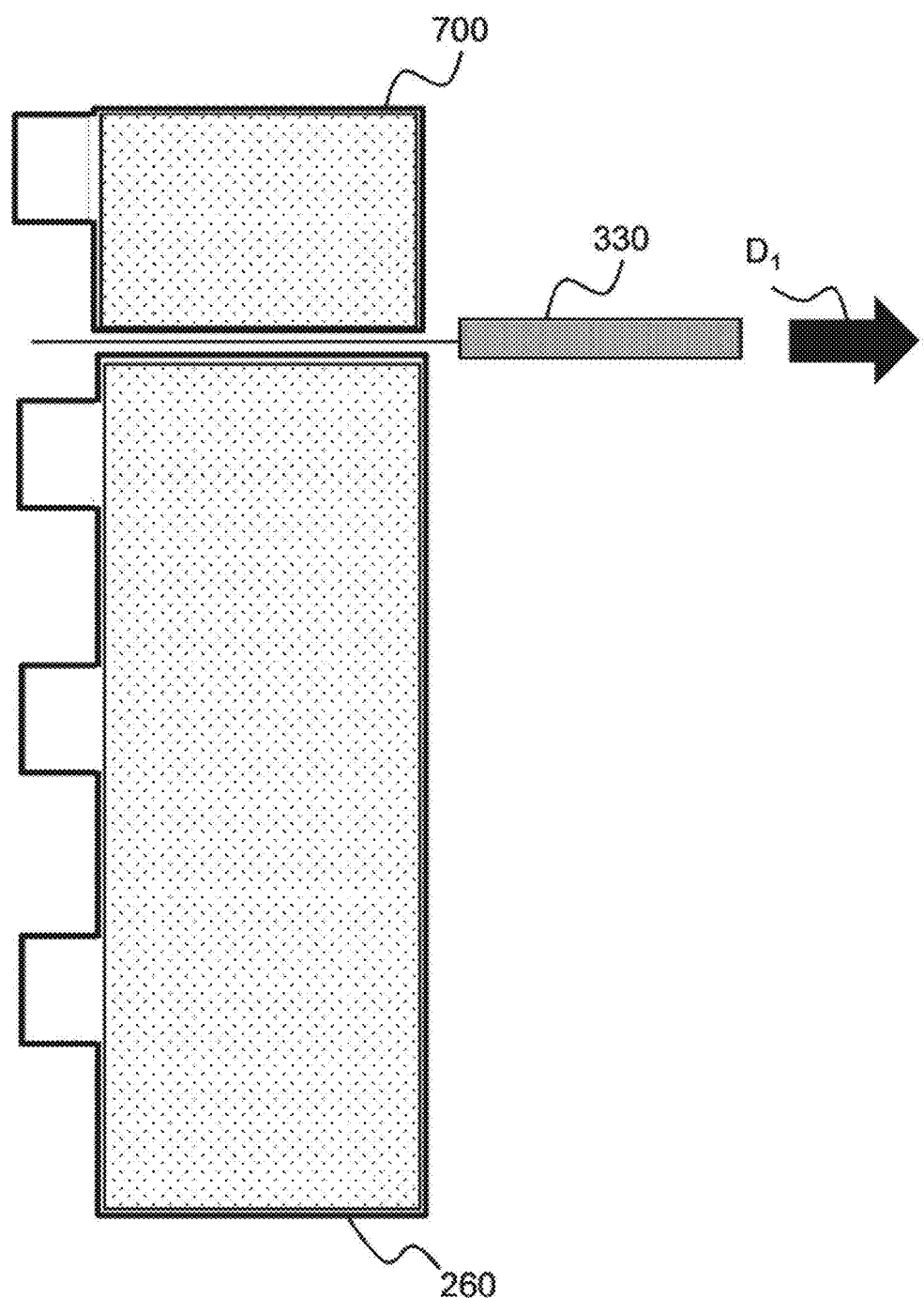
FIG. 11 is a schematic plan view illustrating a cutting process of forming a unit electrode in a method of manufacturing an electrode for a secondary battery according to an exemplary embodiment of the present disclosure.

FIG. 11 is a schematic plan view illustrating a cutting process of forming a unit electrode in a method of manufacturing an electrode for a secondary battery according to an exemplary embodiment of the present disclosure.

Referring to FIG. 10 and FIG. 11, in the method of manufacturing an electrode for a secondary battery according to an exemplary embodiment of the present disclosure, a cutting process of forming a unit electrode 700 by cutting the electrode strip 260 uniformly in the first direction $D_1$ using a cutter 330 is further performed after the notching process of FIG. 10.

As described above, the method of manufacturing an electrode for a secondary battery according to the present disclosure can prevent wrinkles or wave patterns, which are generated when a shear force is applied to a non-coated part by a cutter during a slitting process, from being further lengthened or deepened by performing a process of forming non-continuous linear slits in the non-coated part of a metal foil in a second direction before a process of continuously forming slurry coated parts, during a process of continuously forming the slurry coated parts, or between the processes of continuously forming the slurry coated parts and forming the slurry coated parts, thereby reducing defects due to folding of the non-coated part or an electrode tab by the wrinkles or wave patterns.

The invention claimed is:

1. A method of manufacturing an electrode for a secondary battery, comprising:
    providing a metal foil, which is initially uncoated;
    a process of continuously forming two or more slurry coated parts on one surface or both surfaces of the metal foil in a second direction which is a longitudinal direction of the metal foil so that a non-coated part is positioned between the slurry coated parts coated with the electrode slurry, including an electrode active material, in a first direction which is a transverse direction of the metal foil;
    a process of forming non-continuous linear slits in the initially uncoated metal foil or in the non-coated part of the metal foil in the second direction, before forming mixture coated parts;
    a process of forming the mixture coated parts by drying the slurry coated parts and rolling by a roller; and
    a process of forming electrode strips by cutting along the non-continuous linear slits.

2. The method of manufacturing an electrode for a secondary battery according to claim 1, wherein the metal foil is made of one or more selected from the group consisting of stainless steel, aluminum, copper, nickel, titanium, and an aluminum alloy.

3. The method of manufacturing an electrode for a secondary battery according to claim 1, wherein the process of forming the non-continuous linear slits is performed before continuously forming the slurry coated parts.

4. The method of manufacturing an electrode for a secondary battery according to claim 1, wherein the process of forming the non-continuous linear slits is performed while continuously forming the slurry coated parts.

5. The method of manufacturing an electrode for a secondary battery according to claim 1, wherein the process of forming the non-continuous linear slits is performed between continuously forming the slurry coated parts and forming the mixture coated parts.

6. The method of manufacturing an electrode for a secondary battery according to claim 1, wherein a length of each of the non-continuous linear slits is in a range of about 1 to 200 mm.

7. The method of manufacturing an electrode for a secondary battery according to claim 1, wherein an interval between the non-continuous linear slits is in a range of about 1 to 1000 mm.

8. The method of manufacturing an electrode for a secondary battery according to claim 1, wherein the non-continuous linear slits are formed perpendicular to the first direction.

9. The method of manufacturing an electrode for a secondary battery according to claim 1, wherein, in the process of forming the electrode strips, the slitting of the non-coated part is performed by cutting between the non-continuous linear slits.

10. The method of manufacturing an electrode for a secondary battery according to claim 1, wherein, after the process of forming the electrode strips, a notching process of forming the electrode tab by partially cutting the slit non-coated part of the electrode strip is further included.

11. The method of manufacturing an electrode for a secondary battery according to claim 10, wherein, after the notching process, a cutting process of forming a unit electrode by cutting the electrode strip uniformly in the second direction is further included.

* * * * *